Patented June 20, 1950

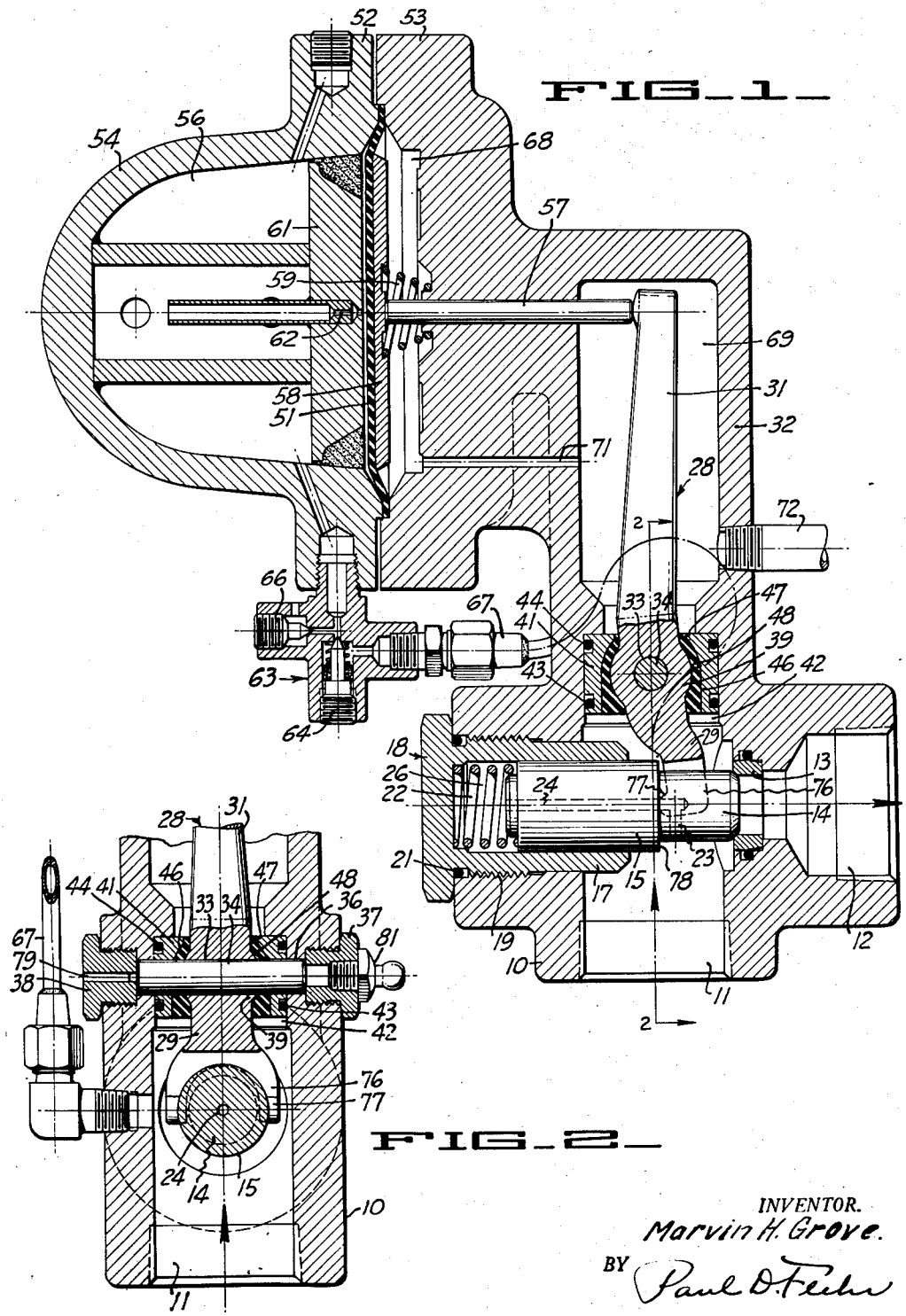

2,511,844

UNITED STATES PATENT OFFICE 2,511,844

FLUID FLOW CONTROL DEVICE

Marvin H. Grove, Piedmont, Calif., assignor to Fluid Control Engineering Co., a copartnership consisting of Marvin H. Grove and Julia E. Grove, both of Piedmont, Calif.

Application November 5, 1945, Serial No. 626,727

5 Claims. (Cl. 137—153)

This invention relates generally to the construction of devices for controlling flow of various fluids, particularly fluids at relatively high pressures.

In the construction of such flow control devices as pressure reducing regulators, it has been common to have a direct motion transmitting connection between a fluid operated diaphragm and the movable valve member. A regulator of this type which is well suited to handling relatively high pressures is disclosed in Grove Patent No. 2,047,101. In place of a direct connection between the diaphragm and the valve member, as by means of a valve stem or push rod, it has been proposed to utilize motion connecting means including a fulcrumed lever whereby movements of a given amplitude of the diaphragm produce movements of a lesser amplitude of the valve member. However due to certain inherent characteristics such lever type regulators have not been suitable for certain services, such as for the control of relatively high pressures.

It is an object of the present invention to provide a fluid flow control device of the lever type which is adapted for use on relatively high fluid pressures.

A further object of the invention is to provide a fluid flow control device which is not subject to freezing or excessive erosion when used on high pressure gas lines.

Another object of the invention is to provide a device of the above character which can be readily assembled in manufacture, and which can be readily repaired in the field.

Additional objects of the invention will appear from the following description in which the preferred embodiment has been shown in detail in conjunction with the accompanying drawing.

Referring to the drawing:

Figure 1 is a side elevational view in section illustrating a pressure reducing regulator incorporating the present invention.

Figure 2 is an enlarged cross-sectional detail taken along the line 2—2 of Figure 1.

The device illustrated in the drawing is suitable for use as a pressure reducing regulator. It consists of a main body part 10 provided with the inlet and outlet passages 11 and 12 for connection with associated piping. It is desirable that the axes of these passages be 90° with respect to each other. Within the body there is a valve seat ring 13 cooperating with the movable valve member 14. As suitable means for retaining the valve member for movements in opposite directions between full open and closed positions, it is carried by one end of a cylindrical shaped portion 16, which in turn is slidably guided within the sleeve like portion 17 of the closure plug 18. The plug 18 is seated within the body and retained by the threaded connection 19. It is provided with sealing means such as the resilient O ring 21. A compression spring 22 serves to urge the valve member 14 towards closed position. It is desirable to provide valve member 14 and plunger 16 with connecting ducts 23 and 24 which serve to establish free communication between the inlet passage 11 and the space 26 at the end of the portion 16.

The mechanism for operating the valve member 14 includes a lever 28 having an arm 29 which is disposed within the main body part, and an arm 31 which is disposed within an extension 32 of the body. The intermediate portion of the lever between the two arms has a transverse bore 33 serving to receive the pivot pin 34. The pin is also fitted within opening 36 in the body, and it is retained in position by suitable means such as the threaded fittings 37 and 38.

In order to form a seal between the intermediate portion of the lever and the surrounding portion of the body, which is capable of withstanding relatively high pressures, that portion of the lever through which pin 34 extends is provided with a spherical or ball shaped enlargement 39. Surrounding this enlargement and spaced from the same there is an annulus 41, which has sealed engagement with the body. It is preferable that annulus 41 have an exterior cylindrical form as illustrated, and of a diameter such that it can be introduced or removed through the inlet passage 11. It is seated within a cylindrical bore 42 formed in the body, and a suitable seal is provided between this annulus and the body on both sides of the pivot pin 34, preferably by means of the resilient O rings 43 and 44. On the low pressure side of the pivot pin 34 the annulus is formed to provide the concave spherical surface 46 which is spaced from the adjacent spherical surface 39. On the high pressure or line side of the pin 34 it is desirable that the bore through the annulus 41 be cylindrical as indicated at 47. The entire space between the annulus and the adjacent portion of the lever 28 is filled with the mass 48 of resilient rubber-like material, such as a suitable grade of synthetic rubber. This rubber is introduced in a suitable molding operation, taking care to leave an opening for subsequent passage of the pin 34. In this molding operation it is desirable that an actual mechanical bond be established between the synthetic rubber and the adjacent surfaces of the lever and the annulus 41.

When assembled as illustrated in Figures 1 and 2 the lever 28 has considerable freedom of rocking movement about the axis of the pivot pin 34, and the assembly is capable of withstanding relatively high fluid pressures from within the main body part, as for example pressures of the order of 1,000 to 6,000 p. s. i. or even more, without causing such stiffness of action as to interfere with proper operation.

The operating means for rocking lever 28 consists of a flexible fluid operated diaphragm 51 which has its peripheral edge clamped between the flanges 52 and 53. Flange 52 is formed on the dome 54 which forms a closed gas chamber 56 on one side of the diaphragm. Flange 53 can be formed as an enlarged integral part of the extension 32. A push rod 57 is slidably carried within the body, and one end of this rod engages the free end of arm 31, while the other end engages the diaphragm plate 58. A light spring 59 serves to retain the diaphragm plate in proper position.

In connection with the diaphragm assembly it is desirable to utilize features disclosed and claimed in said Patent No. 2,047,101. Thus a rigid plate 61 is fixed within the dome 54 in close proximity with one side of the flexible diaphragm 51. This plate has a small flow restricting orifice 62 which communicates between the space adjacent the diaphragm, and the main chamber of the dome.

Chamber 56 may be connected to any convenient source of gas pressure for applying a desired loading force upon the diaphragm. However in this instance the dome is shown provided with a suitable fitting 63 to enable high pressure air or gas to be bled into chamber 56 and trapped therein, or gas to be vented to the atmosphere to lower the loading pressure. Briefly such a fitting can be provided with needle valves 64 and 66, together with a pipe connection 67 to the inlet side of the valve. Upon opening needle valve 64 gas from the inlet side can be introduced into the space 56 to increase the loading pressure. When it is desired to lower the dome pressure needle valve 66 is opened to permit the venting of gas to the atmosphere.

The chamber 68 on the other (or lower) side of the diaphragm is shown connected to the space 69 within the extension 32, by duct 71. Pipe 72 connects space 69 to a point of controlling pressure, which for example when the device is to be used for pressure reducing regulation, can be the down stream or outlet side of the valve.

A suitable motion transmitting connection is employed between the lever 28 and the valve member 14. Thus the arm 29 in this instance is divided to form two branches 76 of a fork, and these branches are provided with rounded portions 77 which engage the annular shoulder 78 at one end of the cylindrical portion 15. The arrangement of parts is such that when the diaphragm 51 is at or near its one limiting position, the valve member is closed upon the seat ring 13. However, when the diaphragm is moved to an intermediate or its other limiting position, the valve member is moved to intermediate or full open positions.

If desired suitable lubricant can be provided for the surfaces in engagement between the pivot pin 34 and the lever 28. For this purpose the fitting 37 is shown provided with a lubricant vent passage 79, and the fitting 38 is shown provided with a pressure lubricant fitting 81. By means of suitable ducts or grooves in the pin 34, it is evident that suitable lubricating grease can be introduced under pressure.

Operation of the device described above can be explained as follows: In a typical instance where the device is to be used for pressure reducing regulation, to maintain a substantially constant pressure on the outlet side, inlet 11 is connected to a suitable source of gas under pressure, as for example a natural gas well or gas main, and outlet 12 is connected to piping or system in which the lower desired pressure is to be maintained. Pipe 72 is also connected at a convenient point to the low pressure system. Outlet pressure is therefore applied to one side of the diaphragm by virtue of the communication between spaces 68 and 69, through ducts 71. The pressure within chamber 56 is set at a value which determines the outflow pressure maintained. When the outlet pressure drops below the value desired, due for example to increased gas consumption on the outlet side, the pressure in space 68 on one side of the diaphragm is lowered whereby the loading upon the other side of the diaphragm causes the diaphragm to be flexed to thereby cause push rod 57 to move lever 28. Such rocking motion causes opening movement of the valve member 14.

Relatively high pressures can be applied to the inlet 11 without interfering with the desired rocking movement of the lever 28. In other words such pressures are resisted by the seal between the intermediate portion of the lever and the body, without causing the setting up of forces tending to effectively interfere with the rocking movement. Rocking motion of the lever is accommodated by movement within the mass 48 of resilient material, although at the same time the mass of resilient material does not take the thrust of pressure upon the lever, due to the fact that such thrusts are borne by the pivot pin 34. In addition the pivot pin serves to maintain the lever in proper operating position at all times.

The discharge into the outlet passage 12 occurs straight through the orifice of the seat ring 13, and this straight through flow path is unobstructed by any stems, push rods, etc. Thus the device is not subject to severe erosion such as it apt to occur in devices handling relatively high gas pressures. In addition the straight through discharge tends to avoid accumulation of ice on or adjacent to the valve working surfaces irrespective of the extent to which gas is expanded.

The assembly of the device in manufacture, and repair under field conditions, is greatly simplified by the construction and arrangement of the parts. As previously explained the lever 28 is manufactured together with the annulus 41, in that these parts are bonded together by the resilient material 48. This assembly can be introduced or removed from the valve body through the inlet 12, when the inlet is not obstructed by the main valve 14 and the closure plug 18.

Previous mention has been made of the fact that the diaphragm is isolated from the main line fluid. This makes it possible to apply controlling pressures to the spaces 68 and 69 independently of the line pressure, and in addition it avoids undesirable accumulation of condensable constituents which might tend to interfere with operation of the diaphragm or otherwise cause injury to the same. Also as previously mentioned pipe 74 may connect to a source of fluid pressure other than the line fluid being handled, or if desired the device can be operated in such a position that spaces 68, 69 and duct 71 can be filled with a pressure transmitting fluid, such as glycerin, and to which line pressure is applied.

I claim:

1. In a fluid flow control device of the type including a body having inflow and outflow passages, a valve seat formed within the body, a valve member disposed within the body and movable in opposite directions between open and closed positions relative to the seat, a fluid pressure operated diaphragm, mounting means for said diaphragm forming a fluid chamber on one side of the same, and a body extension serving to carry said mounting means, means forming a mechanical motion transmitting connection between the valve member and the diaphragm comprising a lever having one arm of the same within the main body part and another arm of the same within the extension, the arm within the body part having a connection with the valve member to move the same; the improvement comprising a mass of resilient material permitting rocking movement of the lever and serving to form a fluid tight seal between the lever and that portion of the body surrounding the location of the fulcrum.

2. In a fluid flow control device of the type including a body having inflow and outflow passages, a valve seat formed within the body, a valve member disposed within the body and movable in opposite directions between open and closed positions relative to the seat, a fluid pressure operated diaphragm, mounting means for said diaphragm, and a body extension serving to carry said mounting means, means forming a motion transmitting connection between the valve member and the diaphragm including a lever having one arm of the same within the main body part and another arm of the same within the extension, a pivot pin carried by the body and extending through the lever to form a fulcrum for the latter, and means forming a fluid tight resilient seal between the lever and that portion of the body surrounding the location of the fulcrum.

3. The subcombination as in claim 2 in which said last means forming a fluid tight seal comprises a mass of resilient rubber-like material surrounding the pivot pin and also that portion of the lever through which the pivot pin extends.

4. In a fluid flow control device of the type including a body having inflow and outflow passages, a valve seat formed within the body, a valve member disposed within the body and movable in opposite directions between open and closed positions relative to the seat, a fluid pressure operated diaphragm, mounting means for said diaphragm, and a body extension serving to carry said mounting means; means forming a sealed motion transmitting connection between the valve member and the diaphragm comprising a lever having one arm of the same within the main body part and another arm of the same within the extension, a substantially spherical shaped enlargement formed on the lever intermediate said arms, a pivot pin carried by the body and extending through said spherical shaped enlargement, and means forming a fluid tight seal between the lever and that portion of the body surrounding the location of the fulcrum, said means including a mass of resilient rubber-like material extending about said spherical shaped enlargement and also about the pivot pin.

5. In a fluid flow control device of the type including a body having inflow and outflow passages, a valve seat formed within the body, a valve member disposed within the body and movable in opposite directions between open and closed positions relative to the seat, and a body extension; operating mechanism for the valve member comprising a lever having one arm of the same within the main body part and another arm of the same within the extension, that part of the lever intermediate said arms having a spherical shaped enlargement, a pivot pin carried by the body and extending through said enlargement, an annulus seated within the body and having an opening diametrically through the same for receiving said pivot pin, a portion of said annulus on the extension side of said pivot pin affording a substantially spherical shaped socket spaced from the opposed spherical surface of said lever enlargement, and a mass of resilient rubber-like material within the space between said annulus and said spherical shaped enlargement, said mass of resilient material serving to seal the space between the lever and the annulus against leakage from the main part of the body while permitting limited rocking motion of the lever to operate the valve member.

MARVIN H. GROVE.

REFERENCES CITED

The following references are of record in the file of this patent:

UNITED STATES PATENTS

| Number | Name | Date |
| --- | --- | --- |
| 663,879 | O'Brien | Dec. 18, 1900 |
| 2,138,927 | Petroe | Dec. 6, 1938 |
| 2,165,132 | Roney | June 20, 1939 |
| 2,388,327 | Jacobson | Nov. 6, 1945 |